UNITED STATES PATENT OFFICE.

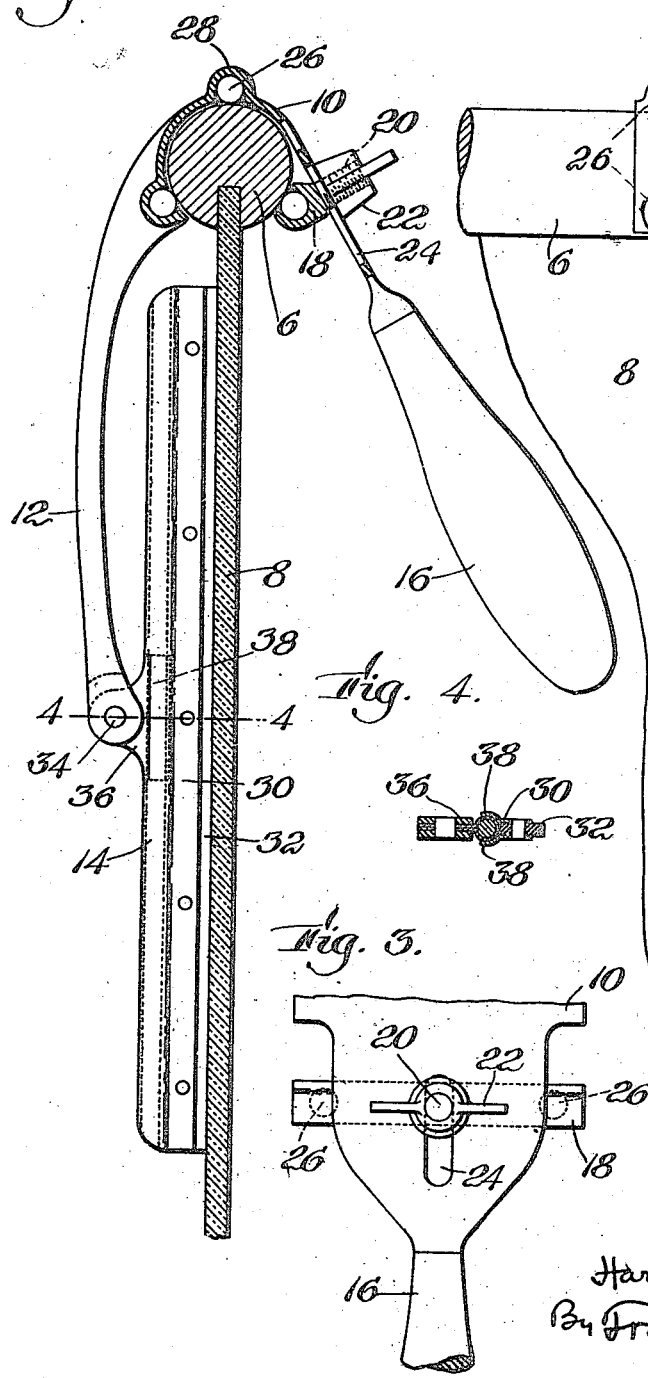
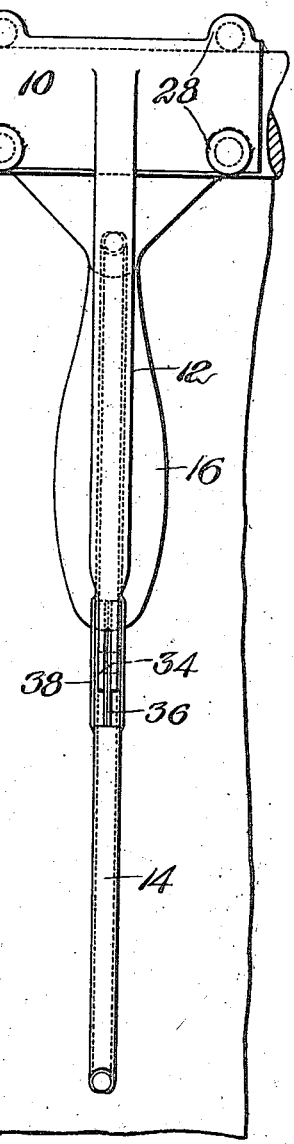
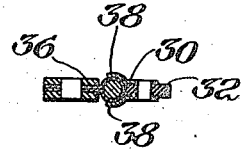
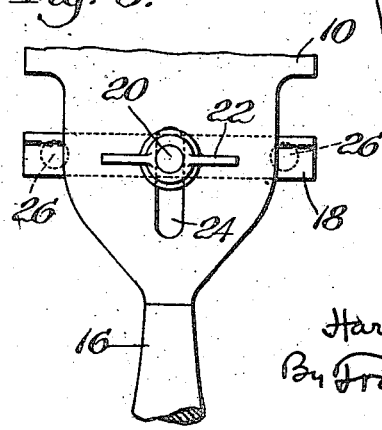

HARRY P. WEBB, OF DEDHAM, MASSACHUSETTS.

WIND-SHIELD CLEANER.

1,209,785.

Specification of Letters Patent.   Patented Dec. 26, 1916.

Application filed May 5, 1916.  Serial No. 95,692.

*To all whom it may concern:*

Be it known that I, HARRY P. WEBB, a citizen of the United States, residing at Dedham, in the county of Norfolk and State of Massachusetts, have invented a new and useful Improvement in Wind-Shield Cleaners, of which the following is a specification, reference being had therein to the accompanying drawings.

My invention relates to improvements in devices for cleaning automobile wind-shields of rain, snow or moisture.

The main object of the invention is to provide a device of the character described which is simple and cheap in construction, easy to manipulate and capable of being quickly applied and adjusted to wind-shields of various sizes and forms of construction.

A further object is to provide a device which, when mounted on a wind-shield, may be moved from side to side with facility and rapidity in order to clean the glass or other transparent medium of which the shield may be made and to permit a clear vision of objects in front of the automobile.

Other objects of the invention will be more specifically set forth and described hereinafter.

In the accompanying drawings, illustrating the preferred embodiment of my invention, Figure 1 is a side elevation of a device constructed in accordance therewith and showing it mounted on a wind-shield, the latter being shown in cross-section; Fig. 2 is a front elevation of the device mounted on a wind-shield looking from left to right in Fig. 1; Fig. 3 is a plan view looking obliquely downwardly in Fig. 1 showing the means for adjusting the device to a wind-shield; and Fig. 4 is a sectional view on line 4—4 in Fig. 1 showing the construction of the wiper.

In the drawings illustrating a wind-shield cleaner constructed and operated in accordance with my invention is shown a portion of an ordinary type of automobile wind-shield in which 6 designates the frame and 8 the glass or other transparent medium.

The cleaner comprises a semi-tubular part 10 adapted to fit over the top portion of the wind-shield frame 6 and to be moved back and forth thereon in the cleaning operation. Depending from said part 10 on the front side of the wind-shield is an arm 12 carrying a wiper 14 and on the rear side of the shield is a depending handle 16 in a position to be grasped by the driver of the automobile. Preferably the semi-tubular part 10, the arm 12 and the handle 16 are made in one piece or casting although they may be made separately, if desired, and fastened together in proper relation by any suitable means.

In order that the cleaner may be removably secured to the top of a wind-shield frame and may also be used in connection with shields having frames of varying sizes in cross-section, I provide means which are adjustable for securing it in operative position. One form of such means is shown in the drawings and consists of a locking member 18 in the form of a bar having a centrally disposed stud 20 which is threaded to receive a thumb-screw 22. The member 10 is provided with a transverse slot 24 in such position that when the locking-bar is arranged between the frame 6 and the member 10 with the stud 20 projecting through the said slot as shown in Fig. 1, it may be pushed upwardly to lock the tubular member on the frame and then may be secured in that position by the thumb-screw. The slot 24 permits the locking-bar to be adjusted in various positions to accommodate frames of varying size in cross-section.

For the purpose of enabling the cleaner during the cleaning operation to be moved to and fro upon the frame, without requiring appreciable effort and without friction, the semi-tubular member 10 is provided with ball-bearings on its inner surface consisting of balls 26 set in pockets 28 formed in the member 10 at necessary points. The member 10, it will be noticed, does not engage the frame 6, but slides to and fro upon the balls 26.

The wiper 14 is made up of a back 30 carrying a cleaning strip 32 of suitable material such as rubber or felt, and is pivotally secured to the arm 12 by a pin 34 and a hinge 36. This permits of two movements of the wiper with relation to the arm 12: a pivotal movement in the same plane as the arm and wiper around the pin 34 as a pivot and also a movement on the hinge, this latter movement being in both directions and limited by portions 38 of the back engaging the end of the arm 12. The first movement allows the cleaning strip of the wiper to engage the glass of the wind-shield along its entire edge when the cleaner is adjusted in position and the second movement permits the wiper to make an oblique engagement with the glass when the cleaner is operated.

The operation of my device is extremely simple. The thumb-screw 22 is first loosened which permits the locking-bar 18 to be dropped and the semi-tubular member 10 to be mounted on the top of the frame of the wind-shield. At the same time the handle is so held that the wiper is forced against the front surface of the wind-shield and the cleaner is then secured in that position by wedging the locking-bar 18 between the frame 6 and the member 10 and fastening it in place by turning the thumb-screw 22. The cleaning operation is performed by grasping the handle and moving the cleaner from side to side on the frame of the wind-shield, keeping the wiper in close engagement with the glass by bearing upwardly on the handle. When being operated the wiper swings to a limited extent upon the hinge and is drawn over the glass while in an oblique relation thereto.

When not in use the cleaner may be moved to one side of the wind-shield where it will not obstruct the view and may be allowed to remain there until required.

It will be noted that my cleaner may be mounted on and removed from the wind-shield with little expenditure of time and effort and moreover can be operated easily and with little effort. Furthermore, owing to the fact that the semi-tubular portion is provided with ball-bearings, the locking-bar may be so adjusted as to hold the semi-tubular member in tight engagement with the frame of the wind-shield and thereby prevent any rattling of the cleaner when the automobile is in motion and all this without making the device difficult to operate.

It is to be understood that my invention is not to be limited to the exact details of construction shown and described herein but may be embodied in other forms all within the purview of the following claims.

What I claim is:—

1. A wind-shield cleaner comprising a semi-tubular portion adapted to be mounted on the frame of the wind-shield and provided with ball-bearings in engagement with said frame, means carried by said semi-tubular portion for cleaning the wind-shield, a handle for moving said cleaner back and forth on said frame and means for locking said cleaner upon the frame of said wind-shield.

2. A wind-shield cleaner comprising a semi-tubular portion adapted to be mounted on the frame of the wind-shield and provided with ball-bearings in engagement with said frame, means carried by said semi-tubular portion for cleaning the wind-shield, a handle for moving said cleaner back and forth on said frame and adjustable means for locking said cleaner upon the frame of said wind-shield.

3. A wind-shield cleaner comprising a semi-tubular portion adapted to be mounted on the frame of the wind-shield, means carried by said semi-tubular portion for cleaning the wind-shield when said tubular portion is moved to and fro on said frame, a handle for moving said cleaner to and fro on said frame and adjustable means for locking said cleaner upon the frame of said wind-shield.

4. A wind-shield cleaner comprising a semi-tubular portion adapted to be mounted on the frame of the wind-shield, means carried by said semi-tubular portion for cleaning the wind-shield when said tubular portion is moved to and fro on said frame, a handle for moving said cleaner to and fro on said frame and a locking-bar for locking said cleaner upon the frame of said wind-shield.

5. A wind-shield cleaner comprising a semi-tubular portion adapted to be mounted on the frame of the wind-shield, means carried by said semi-tubular portion for cleaning the wind-shield when said tubular portion is moved to and fro on said frame, a handle for moving said cleaner to and fro on said frame and an adjustable locking-bar for locking said cleaner upon the frame of said wind-shield.

6. A wind-shield cleaner comprising a semi-tubular portion adapted to be mounted on the frame of a wind-shield, a wiper carried by said semi-tubular portion, a handle for moving said cleaner back and forth on said frame and a locking-bar; said locking bar being adjustable in order to permit said cleaner to be mounted on frames of varying sizes in cross-section and to be locked against removal therefrom but not against movement to and fro on said frame during said cleaning operation.

7. A wind-shield comprising a semi-tubular portion adapted to be mounted on the frame of a wind-shield and provided with ball bearings in engagement with said frame, means carried by said semi-tubular portion for cleaning the wind-shield, a handle for moving said cleaner back and forth on said frame and means for locking said cleaner upon the frame of said wind-shield to prevent removal therefrom, said locking means being adjustable to permit the cleaner to be mounted on frames of varying dimensions in cross-section and being provided with ball bearings in engagement with said frame.

8. A wind-shield cleaner comprising a semi-tubular portion adapted to be movably mounted on the frame of a wind-shield and provided with a depending arm and a handle, a wiper pivotally mounted on said depending arm and means for locking said semi-tubular portion on said frame; said means being adjustable to permit said semi-tubular portion to be mounted on frames of various sizes in cross-section and comprising a bar adapted to engage said frame and means whereby said bar may be locked in any adjusted position.

In testimony whereof, I hereunto set my hand this fourth day of May, 1916.

HARRY P. WEBB.